United States Patent
Wu et al.

(10) Patent No.: US 7,277,723 B2
(45) Date of Patent: Oct. 2, 2007

(54) METHOD FOR INPUTTING AND PERMUTING ORIGINAL SCRIPTS TO EXTERNAL MOBILE PHONE AND THE DEVICE FOR PERFORMING THE SAME

(75) Inventors: Yuan-Heng Wu, Taiwan Hsien (TW); Chien-Feng Wang, Taiwan Hsien (TW); Wei-Chao Wu, Taiwan Hsien (TW)

(73) Assignee: ACE CAD Enterprise Co., Ltd., Taipei Hsien (TW)

( * ) Notice: Subject to any disclaimer, the term of this patent is extended or adjusted under 35 U.S.C. 154(b) by 0 days.

(21) Appl. No.: 11/206,837

(22) Filed: Aug. 19, 2005

(65) Prior Publication Data

US 2006/0045345 A1    Mar. 2, 2006

(30) Foreign Application Priority Data

Aug. 6, 2004  (TW) .............................. 93125512 A

(51) Int. Cl.
*H04M 1/00* (2006.01)
(52) U.S. Cl. ................ 455/550.1; 455/566; 455/556.1; 455/557; 455/556.2; 382/187; 382/181; 382/188; 382/189; 382/190
(58) Field of Classification Search ............. 455/550.1, 455/566, 556.1, 556.2, 557; 382/187, 181, 382/188, 189, 190
See application file for complete search history.

(56) References Cited

U.S. PATENT DOCUMENTS

| 6,002,387 | A  | * | 12/1999 | Ronkka et al. | ............. 345/157 |
| 6,647,125 | B2 | * | 11/2003 | Matsumoto et al. | ........ 382/100 |
| 6,724,375 | B2 | * | 4/2004 | Wu et al. | ................... 345/179 |
| 2002/0010006 | A1 | * | 1/2002 | Wang | ......................... 455/566 |
| 2002/0171853 | A1 | * | 11/2002 | Wu | ............................ 358/1.9 |
| 2003/0138144 | A1 | * | 7/2003 | Lynggaard | .................. 382/181 |

* cited by examiner

*Primary Examiner*—Joseph Feild
*Assistant Examiner*—Khai Nguyen

(57) ABSTRACT

An external device of a mobile phone for inputting and permuting original script comprises a handwriting sensing device for sensing handwriting script and generating script coordinates or displacement data; a transmission interface for transmitting the script coordinates or displacement data to a mobile phone; a means for compressing or expansion the scripts from the mobile phone into figure lattices of the same height; and permuting the figure lattices on a display screen of the mobile phone in order so as to form a drawing showing original scripts. Furthermore, a method is included, which comprises the steps of sensing handwriting script and generating script coordinates or displacement data; transferring the script coordinates or displacement data to a mobile phone; compressing or expansion the scripts from the mobile phone into figure lattices of the same height; and permuting the figure lattices on a display screen of the mobile phone.

9 Claims, 5 Drawing Sheets

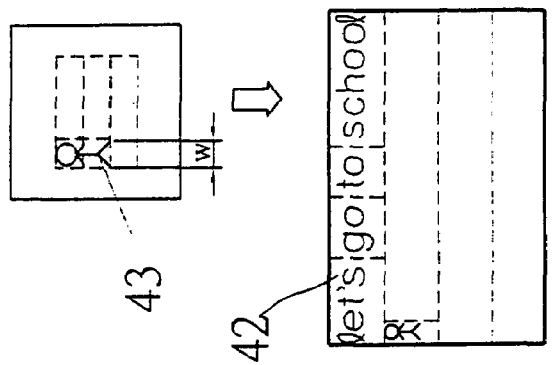
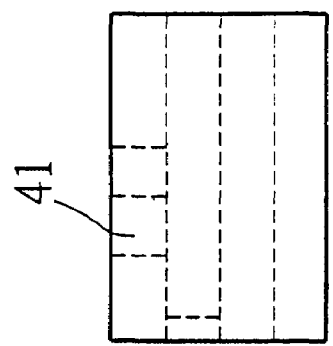
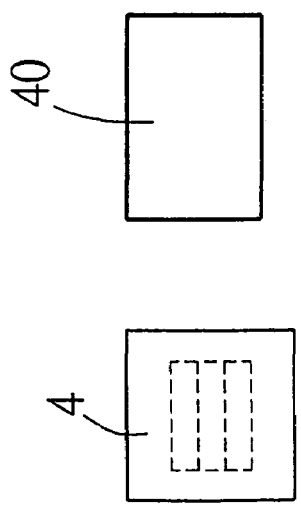
Fig. 4

METHOD FOR INPUTTING AND PERMUTING ORIGINAL SCRIPTS TO EXTERNAL MOBILE PHONE AND THE DEVICE FOR PERFORMING THE SAME

FIELD OF THE INVENTION

The present invention relates to handwriting script input of the mobile phones, and particular to a method for inputting and permuting original scripts to an external mobile phone and the device for performing the same.

BACKGROUND OF THE INVENTION

With the promotion of wireless technology and the popularity of mobile phones, besides the voice communications, there are more and more messages and emails transmitted wirelessly through the mobile phones. However, because users can only input data through keypad on the mobile phone, mobile phones can only transmit alphabets and characters, but not handwriting scripts. While the keys on the mobile phone are finite, to input data into mobile phone is a quite time-consuming effort and complicated. Furthermore, if too many words are necessary to be inputted, the fingers will feel ache after a long time operation.

To improve above mention deficiency, one prior art is to embed a touch panel into the mobile phone. For example, Nokia 6108 mobile phone, the touch panel is hidden below the keypad of the mobile phone for avoiding errors in typewritten. The keypad is lifted when the user needs to input character. Writing upon the writing section on the touch panel, the handwriting scripts are then recognized by the program in the mobile phone, and transferred to a character representing the script into the short message or email applications. However, the writing section area is limited by the small size of the mobile phone. Thereby, the user's wrist must lifts without any support when writing on the touch panel so that cause the wrist feel ache. Moreover, the writing section is only about 3-centimeter squares so that long words, such as "original", "external", etc. cannot be inputted once. Thus, the recognition software program cannot effectively recognize the words. As a result, especially for inputting a long sentence, the input speed is low.

Another example for the prior art to improve the input method is the Motorola 388C mobile phone. This mobile phone is integrated with a Personal Digital Assistance (PDA). A transparent touch panel is overlapped on the display screen of the mobile phone. The touch panel is used to replace the keypad completely for performing the data input. For example, to input the phone number, a numeral keying program is opened for the user to input numerals directly on the screen. When input characters, a character input program is opened for the user to input characters one by one, which are then recognized by character recognition software.

The deficiency of this example is that the size of the mobile phone cannot be smaller, and like the prior example Nokia 6108, the long words still cannot be inputted once. Furthermore, the example operations must install the handwriting recognition program in the operating system of the mobile phone, which will increase the load of the central processing unit, also increase the cost. Moreover, the original scripts cannot be inputted in the handwriting recognition program, the input way cannot be simplified. Again, the scripts and figures cannot be converted according to the height and width of the writing section. As a result, the heights of the input characters and drawings cannot be arranged uniformly. Thereby, from above discussion, it is apparent that the prior arts are not suitable for presenting original scripts on the display screen or transmitting the original scripts out

SUMMARY OF THE INVENTION

The primary object of the present invention is to provide an external device of a mobile phone for inputting and permuting original script, which comprising a handwriting sensing device for sensing handwriting script and generating script coordinates or displacement data; a transmission interface for transmitting the script coordinates or displacement data to a mobile phone; a means for compressing or expansion the scripts from the mobile phone into figure lattices of the same height; and permuting the figure lattices on a display screen of the mobile phone in order so as to form a drawing showing original scripts. Furthermore, a method is included, which comprises the steps of sensing handwriting script and generating script coordinates or displacement data; transmitting the script coordinates or displacement data to a mobile phone; compressing or expansion the scripts from the mobile phone into figure lattices of the same height; and permuting the figure lattices on a display screen of the mobile phone in order.

The various objects and advantages of the present invention will be more readily understood from the following detailed description when read in conjunction with the appended drawing.

BRIEF DESCRIPTION OF THE DRAWINGS

FIGS. 4A to 4C show the third method for permuting handwriting script according to the present invention.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
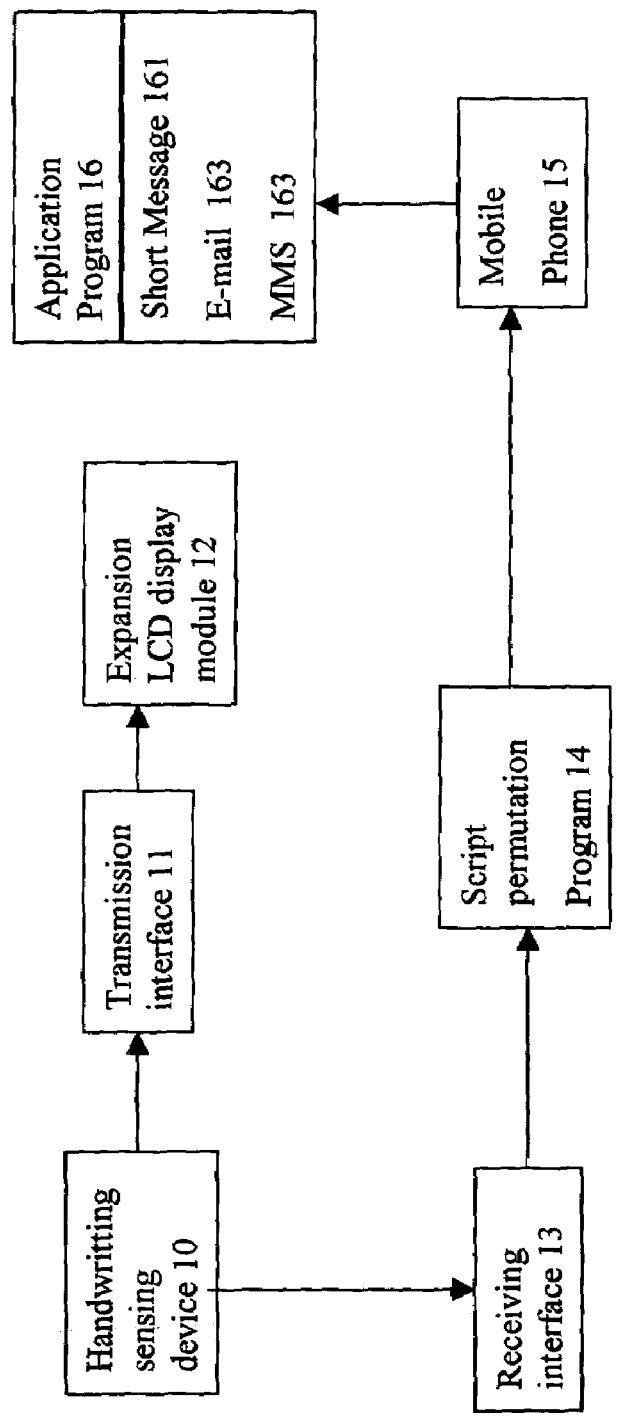
FIG. 1 shows the block diagram of the present invention.

With reference to FIG. 1, the method for permuting handwriting script of the present invention is illustrated. The object of the present invention is to provide a more convenient and humane handwriting input method. Thereby, by the method of the present invention, the handwriting of the user can be displayed on the mobile phone display screen (see FIG. 1) in order according to the principle and permutation method of the present invention. The input device of the present invention includes a pen 1, a digital panel 100, a mobile phone 130, an expansion LCD display module 12, and an application program 16. The digital panel 100 includes a handwriting-sensing device 10 and a transmission interface 11. A resistor or capacitor touch panel, or electromagnetic sensing tablet performs the sensing method of the handwriting-sensing device 10. The digital panel 100 provides a writing section for writing thereon and detecting and collecting the handwriting of the user. The scripts of the user are converted into a script coordinate and displacement data. The transmission interface 11 is used to transmit the script coordinate or displacement data to a mobile phone by wired or wireless way.

Figure 2:
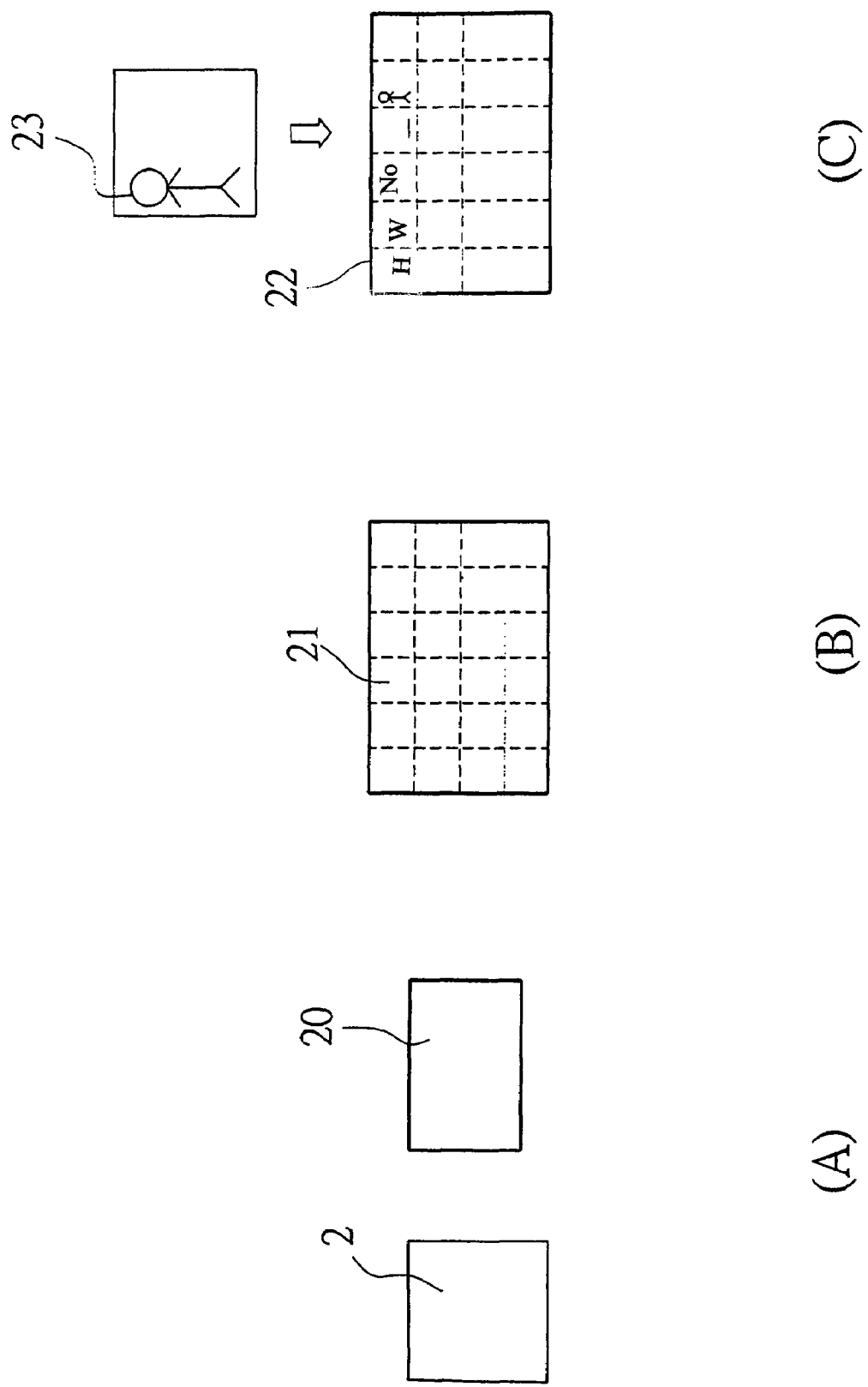
FIGS. 2A to 2C show the first method for permuting handwriting script according to the present invention.

With reference to FIG. 2, the permutation method of the scripts is illustrated. The compressing or expansion ratios of the original scripts are determined by the height and width of the writing section 2 and the height and width of the figure lattice 21 predefined in the display screen 20. The formulas are:

> Compressing or expansion ratio of height=Height of the figure lattice 21/Height of the writing section 2.
>
> Compressing or expansion ratio of width=Width of the figure lattice 21/Width of the writing section 2.

In the method, no matter what the size of the script 23, directly compress or expand the writing section 2 to a fix sized figure lattice 21. In permutation, the figure lattice 21 with the script FIG. 22 is permutated in the display screen 20 in order. The width of the display screen 20 is exactly full of the size of the figure lattice 21. When one row of figure lattice 21 is filled fully, it is permutated to the start of the next row.

By this method, no matter what the size of the script 23 in the writing section 2, using a fixed compressing or expansion ratio to convert the whole writing section 2 into a fixed sized figure lattice 21, it not only increase the calculation speed, but also easier for permutation on the display screen 20. This is the advantage of the method. The disadvantage of the method is that if the scripts 23 are not in uniform size, the converted script FIGS. 22 which permutated on the display screen 20 will not in uniform sizes too. To overcome this disadvantage, the present invention provides a second method for permuting the original scripts.

Figure 3:
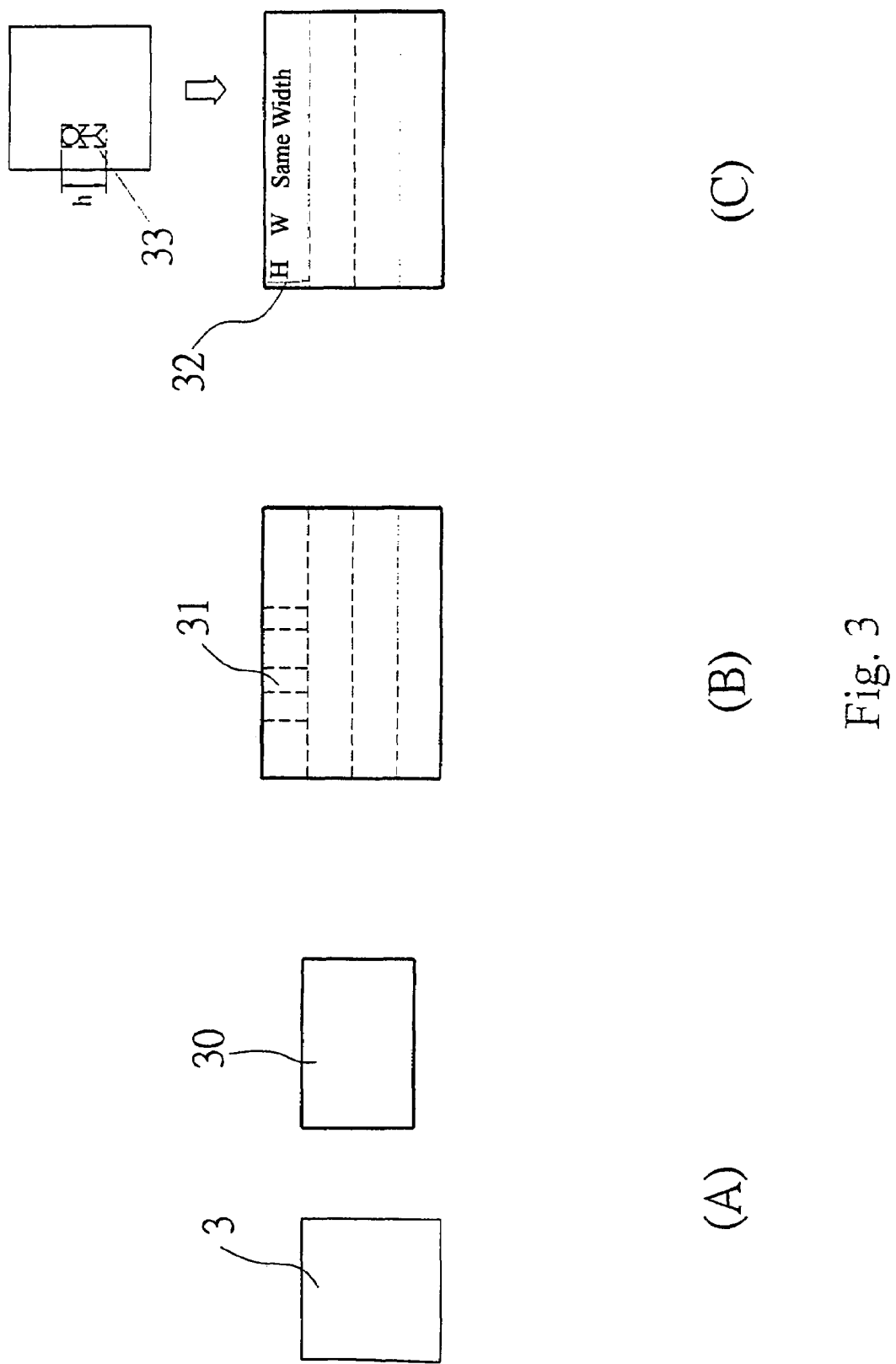
FIGS. 3A to 3C show the second method for permuting handwriting script according to the present invention.

Referring to FIG. 3, another method for permuting the original scripts is illustrated. In this embodiment, the compressing or expansion ratios of the original scripts are determined by the height of the script 33 and the height of the figure lattice 31 predefined in the display screen 30. The formulas are:

> Compressing or expansion ratio of height=Height of the figure lattice 31/Height of the script 33.
>
> Compressing or expansion ratio of width=Compressing or expansion ratio of height Thereby, in the method, the compressing or expansion ratio is changed according to the height of the script 33. The object is to make the height of the script FIG. 32 equals to the height of the figure lattice 31. The compressing or expansion ratio of the width is equal to that of the height. Thus, the script FIG. 32 will not distort after adjustment. Thereby, despite the size of the script 33 in the writing section 3, the script FIG. 32 has the same height. Thereby, after permutation, the size of the script FIG. 32 is identical to have a beautiful outlook.

However, after the compressing or expansion, although the height of the script FIG. 32 is uniform, the width is changed base on the width of the script 33. Therefore, the width of the figure lattice 31 containing the script FIG. 32 is different. However, since the width of the display screen 30 is fixed, in permutation, it is possible that one row is not filled fully. Therefore, the permutation of the method is that the figure lattices 31 containing the script FIGS. 32 after the compressing or expansion are permuted sequentially at one row on the display screen 30. When the surplus space is insufficient to contain the figures lattice 31 to be permuted, the figures lattice 31 will permute to the start of the next row.

In another method of the present invention, referring to FIG. 4, in is method the way for determining a compressing or expansion ratio is based on the height of the writing section 4 and the height of the figure lattice 41 predefined. It is:

> Compressing or expansion ratio of height=Height of the figure lattice 41/height of the writing section 4
>
> Compressing or expansion ratio of width=Compressing or expansion ratio of height This method is suitable for the writing of English. Since the way for writing English is from left to right transversally with a fixed size. In this condition, the writing section 4 of the handwriting-sensing device is designed to be suitable for being performed transversally and to be written with a format for English. Referring to FIG. 4(A), when the English words are written according to the format of the writing section 4, by this method, the writing section 4 is converted to suit the height of the figure lattice 41 by a fixed ratio. The compressing or expansion ratio of width is identical to that of the height so that the script FIG. 42 after compressing or expansion will not distort, while the width of the figure lattice 41 after conversion is corresponding to that of the script 43. Therefore, the script 43 of English will not be adjusted to the script FIG. 42 with the same height after compressing or expansion. Words with different lengths will not be adjusted to the figure lattices 41 with the same width to retain the original figures for English words.

In this method, the height of figure lattices 41 is identical from script FIGS. 42 of different heights, while the width of figure lattices 41 is changed base on the width of the script 43. Therefore, in the permutation method, the permutation way is identical to the second method. Namely, the figure lattices 41 containing script FIGS. 42 after compressing or expansion are permuted sequentially at one row of the display screen 40. When the surplus space is insufficient to contain the figure lattices 41 to be permuted, the figure lattices 41 will permute to the start of the next row.

FIG. 1 shows the block diagram of the present invention. An original script permutation program 14 in the diagram serves to permute the scripts. It is illustrated that a writing section is installed on the handwriting-sensing device 10 of the digital panel 100. The user can write on the writing section by pen 1. The handwriting-sensing device 10 will detect the script and transfer the script into coordinate or displacement data. The data is transmitted to the mobile phone 130 through the transmission interface 11. At the same time, the script data may also transmit to an LCD display module 12 to display the tracks of the scripts on the LCD display.

When the script data is transmitted to the mobile phone 130, the script data is received by a receiving interface 13 in the mobile phone and then is transferred to the script permutation program 14. When the writing work is stop for a while, the script permutation program 14 will convert the received script data into the figure lattices with a predetermined height in accordance with the method of present invention, and then permute the figure lattices to the display screen 15 of the mobile phone 130. Finally, when the user stops to input completely, the permuted script figures will form a drawing on the mobile phone display screen 15. That drawing is finally transferred to an application program for short messages 161 or e-mails 162 to generate an original script short message or original script e-mail. Then the short message or e-mail is transmitted to others through a multi-media message service (MMS) 163.

Referring to FIG. 2, a schematic view for realizing the first method of present invention is illustrated. In FIG. 2(A), a schematic view showing size comparison of the writing section 2 and the display screen 20 of the mobile phone. For example, the size of the writing section 2 is 5 units in height and 5 units in width. The size of the display screen 20 is 2 units in height and 3 units in width. The display screen 20 can be divided into 4 rows. Each row has six figure lattices 21, as shown in FIG. 2(B). In this method, the compressing or expansion ratio of the height is based on the height of the writing section 2 (5 units) corresponding to the height of the figure lattice 21 (2 units/4, i.e., 0.5 unit). The compressing or expansion ratio of the width is based on the width of the writing section 2 (5 unit) corresponding to the width of the figure lattice 21 (3 units/6, i.e., 0.5 unit). No matter what the size of the script 23 that users write on the writing section 2, after the compressing or expansion of the writing section 2 by the ratio mentioned above, the converted script FIG. 22 will contained in figure lattices 21 having the same height and width. The object is to retain the converted scripts not to distort. Moreover, the permutation can be performed easily. When each row is filled with six figure lattices 21, the next row is used, as shown in FIG. 2C.

FIG. 3 shows the second method of the method for permuting handwriting script of the present invention. The FIG. 3A is the size comparison of the writing section 3 and the display screen 30 of the mobile phone. For example, the height of the writing section 3 is 5 units and the width thereof is 5 units. The display screen 30 has a height of 2 units and a width of 3 units. The display screen 30 can be divided into four rows, as shown in FIG. 3B. In this method, the compressing or expansion ratio of the height is based on the height of the script 33 corresponding to the height of the figure lattice 31. The compressing or expansion ratio of width is equal to that of the height. No matter what the size of the script 33 that users write on the writing section 3, after the compressing or expansion by the ratio mentioned above, the converted script FIG. 32 will contained in figure lattices 31 having the same height but different width. Thereby, despite the size of the scripts 33 on the writing section 3, they can convert to script FIG. 32 with the same height. Then, after permutation, they are all in the uniform size, ordered and beautiful outlook. Since the widths of the figure lattices 31 are not identical, in permutation, when the surplus space is insufficient for containing the figure lattices 31 to permute, the figure lattices 31 will permute to the start of the next row. As shown in FIG. 3C.

Referring to FIG. 4, the schematic view about the third method of the method for permuting handwriting script of the present invention is illustrated. FIG. 4A is a schematic view showing the size comparison of the writing section 4 and the display screen 40 of the mobile phone. For example, the size of the writing section 4 has a height of 5 units, and a width of 5 units. The size of the display screen 40 has a height of 2 units and a width of 3 units. The display screen 40 can be divided into four rows, as shown in FIG. 4(B). In this method, the compressing or expansion ratio of the height is based on the height of the writing section 4 (5 units) corresponding to the height of the figure lattice 41 (2 units/4, i.e., 0.5 unit). The compressing or expansion ratio of width is equal to that of the height. The script 43 that users write on the writing section 4 will compress or expanse according to the ratio mentioned above, the converted script FIG. 42 will contained in figure lattices 41 having the same height but different width. The object is to avoid the English script 43 will not adjusted into the figure script 42 with a uniform height after compression or expansion, and the different length words will not be compressed or expanded into the figure lattices 41 of same width so as to retain the original figures of the English script 43. Similarly, since the figure lattices 41 have different widths. In permutation, when the surplus space in one row is insufficient to contain the figure lattices 41 to permute, the figure lattices 41 will permuted from start of a new row, see FIG. 4C.

Figure 5:
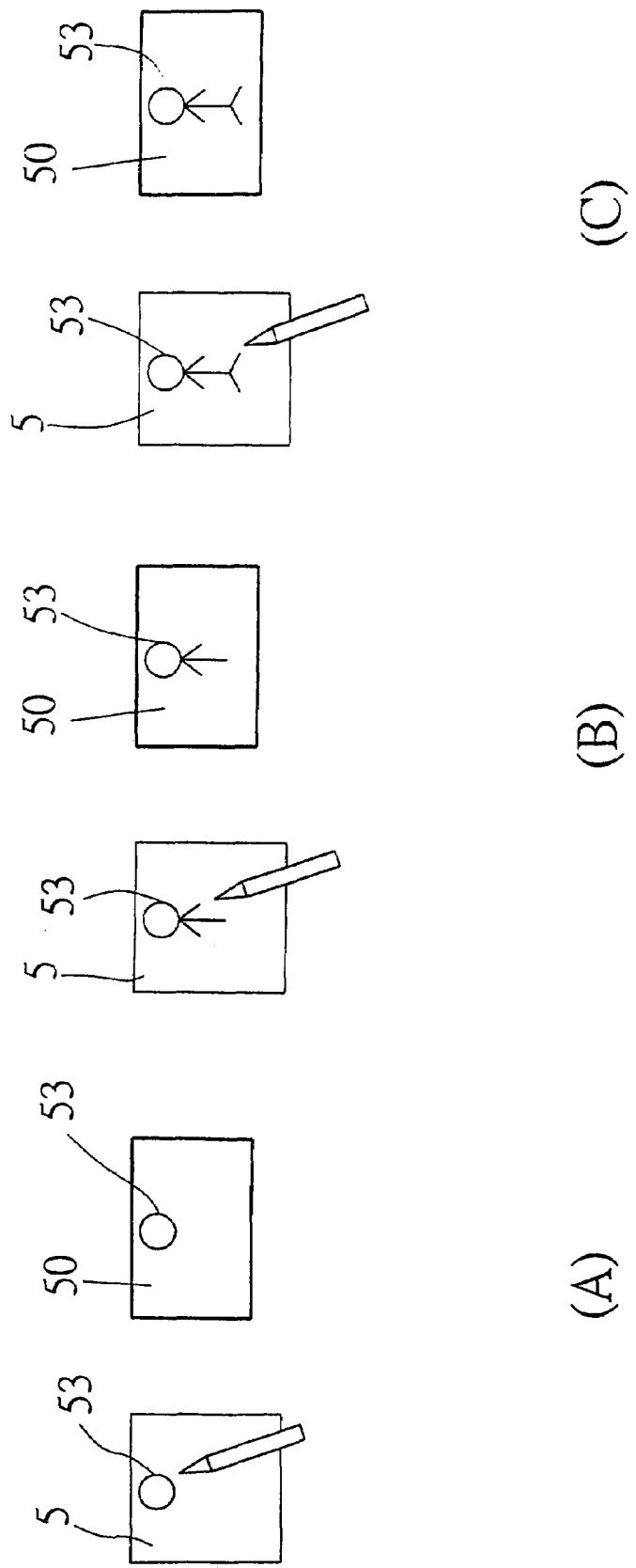
FIGS. 5A to 5C are schematic view about the method of the present invention, wherein the scripts are not permuted.

Referring to FIG. 5, the present invention provides an external device of a mobile phone for inputting and permuting original script. The user may continuously write the character, word or figures on the writing section 5. The handwriting-sensing device senses the script 53, and then transmits the script coordinates or displacement data to the display screen 50 of the mobile phone through the transmission interface, and then the script 53 are displayed on the display screen 50 without compress or expansion (referring to FIG. 5A). When the writing action is continuous, the scripts 53 are detected continuously (referring to FIG. 5B), the script 53 without permutation and with the same size are displayed. When the user stops to input, the detection of the scripts 53 are continuously. After the scripts 53 without permutation and with the same size are displayed (referring to FIG. 5C), the original script permutation program will compress or expand the script coordinates and displacement data by a same ratio to a fix height figure lattices. The scripts 53 with same size are disappeared and the figure lattices are then are permuted on the display screen of the mobile phone. The data can be transferred to the application program (for example, by short messages or e-mails) to form original script short messages or original script e-mails that are transmitted out by the multi-media message service to other users.

Advantages of the present invention will be described hereinafter. The scripts can be compressed or expanded with the same ratio to be permuted from left to right at the same row. The scripts can be converted based on the height and width of the writing section. Furthermore, the scripts can be converted based on the height of the script. Use a writing section with fixed height to write English and figure scripts. The device of the present invention is an external device with a less space. The original script is used so that the present invention can be used in signing. Furthermore, in use of the present invention, the wrist will not lift so that the user will feel easy in writing.

The present invention is thus described; it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for inputting and permuting original scripts to an external mobile phone; the method comprising the steps of:

sensing handwriting scripts and generating script coordinates or displacement data by using a handwriting sensing device;

transmitting the script coordinates or displacement data to a mobile phone by using a transmission interface;

compressing or expansion the scripts from the mobile phone into figure lattices of the same height; and permuting the figure lattices on a display screen of the mobile phone in order so as to form a drawing showing original scripts; and wherein the compressing or expansion of the script is based on a height and a width of the writing section of the handwriting sensing device and predefined height and predefined width of the figure lattice of the display screen so as to determine the ratios of height and width of the compressing or expansion of the script, so that script figures after compressing or expansion are contained in figure lattices of the same height and the same width; in permutation, the figure lattices with the same height and the same width are permuted at the same row of the display screen until the row is filled fully and then permutes to the start of the next row.

2. The method for inputting and permuting original scripts to an external mobile phone as claimed in claim 1, wherein the method is performed by an independent program or existing application program of the mobile phone such as short-message or e-mail applications.

3. The method for inputting and permuting original scripts to an external mobile phone as claimed in claim 1, wherein the mobile phone can synchronously display the handwriting scripts on the display screen while it is receiving, compressing or expanding the handwriting script.

4. A method for inputting and permuting original scripts to an external mobile phone; the method comprising the steps of:

sensing handwriting scripts and generating script coordinates or displacement data by using a handwriting sensing device;

transmitting the script coordinates or displacement data to a mobile phone by using a transmission interface;

compressing or expansion the scripts from the mobile phone into figure lattices of the same height; and permuting the figure lattices on a display screen of the mobile phone in order so as to form a drawing showing original scripts; and wherein the compressing or expansion of the script is based on the height of the handwriting script and predefined height of the figure lattice of the display screen so as to determine the ratios of height and width of the compressing or expansion of the script, so that the height of the script figures after compressing or expansion is same as the height of the figure lattices; while the widths of the figure lattices containing the script figure are corresponding to that of the scripts; in permutation, the figure lattices are sequentially permuted at the same row of the display screen until the surplus space of that row is insufficient for permutation, then permute the figure lattice from the start of the next row.

5. The method for inputting and permuting original scripts to an external mobile phone as claimed in claim 4, wherein the method is performed by an independent program or existing application program of the mobile phone such as short-message or e-mail applications.

6. The method for inputting and permuting original scripts to an external mobile phone as claimed in claim 4, wherein the mobile phone can synchronously display the handwriting scripts on the display screen while it is receiving, compressing or expanding the handwriting script.

7. A method for inputting and permuting original scripts to an external mobile phone; the method comprising the steps of:

sensing handwriting scripts and generating script coordinates or displacement data by using a handwriting sensing device; transmitting the script coordinates or displacement data to a mobile phone by using a transmission interface;

compressing or expansion the scripts from the mobile phone into figure lattices of the same height; and permuting the figure lattices on a display screen of the mobile phone in order so as to form a drawing showing original scripts; and wherein the compressing or expansion of the script is based on the height of the writing section of the handwriting sensing device and predefined height of the figure lattice of the display screen so as to determine the ratios of height and width of the compressing or expansion of the script, so that script figures after compressing or expansion remains in different heights and different widths according to that of the script; the script figures are contained in figure lattices of same height, while the widths of the figure lattices are corresponding to that of the contained script figures; in permutation, the figure lattices are sequentially permuted at the same row of the display screen until the surplus space of that row is insufficient for permutation, then permute the figure lattice from the start of the next row.

8. The method for inputting and permuting original scripts to an external mobile phone as claimed in claim 7, wherein the method is performed by an independent program or existing application program of the mobile phone such as short-message or e-mail applications.

9. The method for inputting and permuting original scripts to an external mobile phone as claimed in claim 7, wherein the mobile phone can synchronously display the handwriting scripts on the display screen while it is receiving, compressing or expanding the handwriting script.

* * * * *